Nov. 23, 1971 — M. M. STERNAU — 3,621,637

APPARATUS FOR FORMING CLOSURES

Original Filed Oct. 23, 1965 — 5 Sheets-Sheet 1

INVENTOR
MARTIN M. STERNAU
BY
James M. Heitman
ATTORNEY.

Nov. 23, 1971    M. M. STERNAU    3,621,637
APPARATUS FOR FORMING CLOSURES
Original Filed Oct. 23, 1965    5 Sheets-Sheet 2
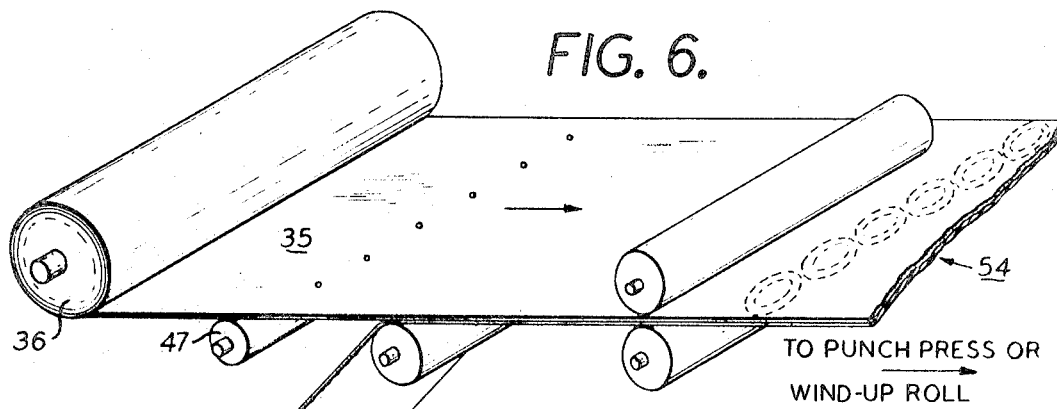
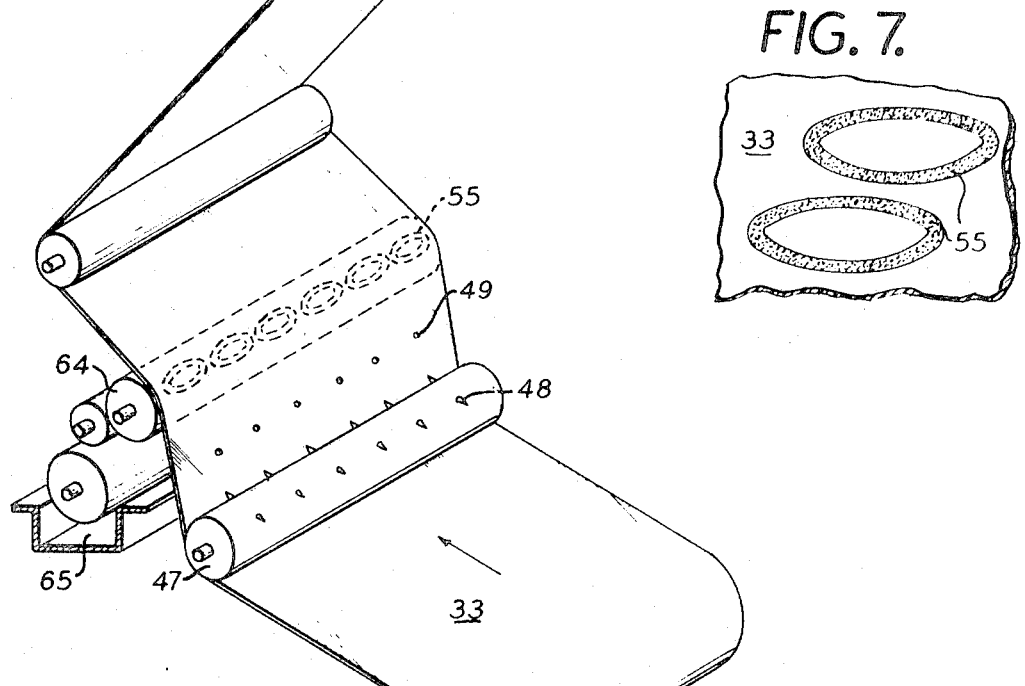
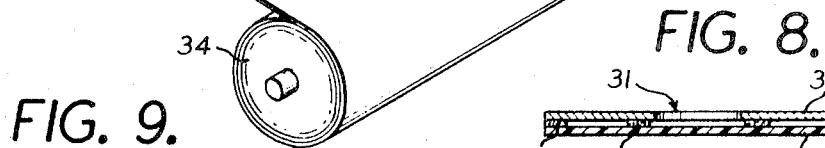
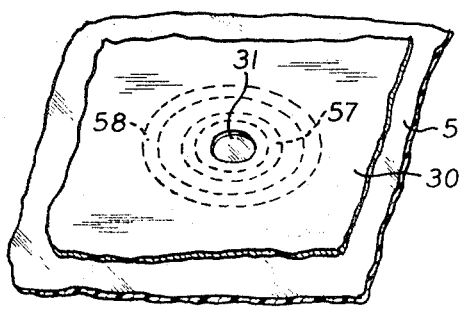
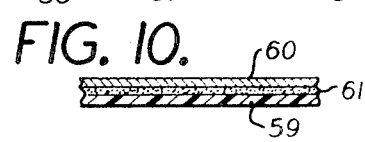
INVENTOR
MARTIN M. STERNAU
BY
*James M. Heilman*
ATTORNEY.

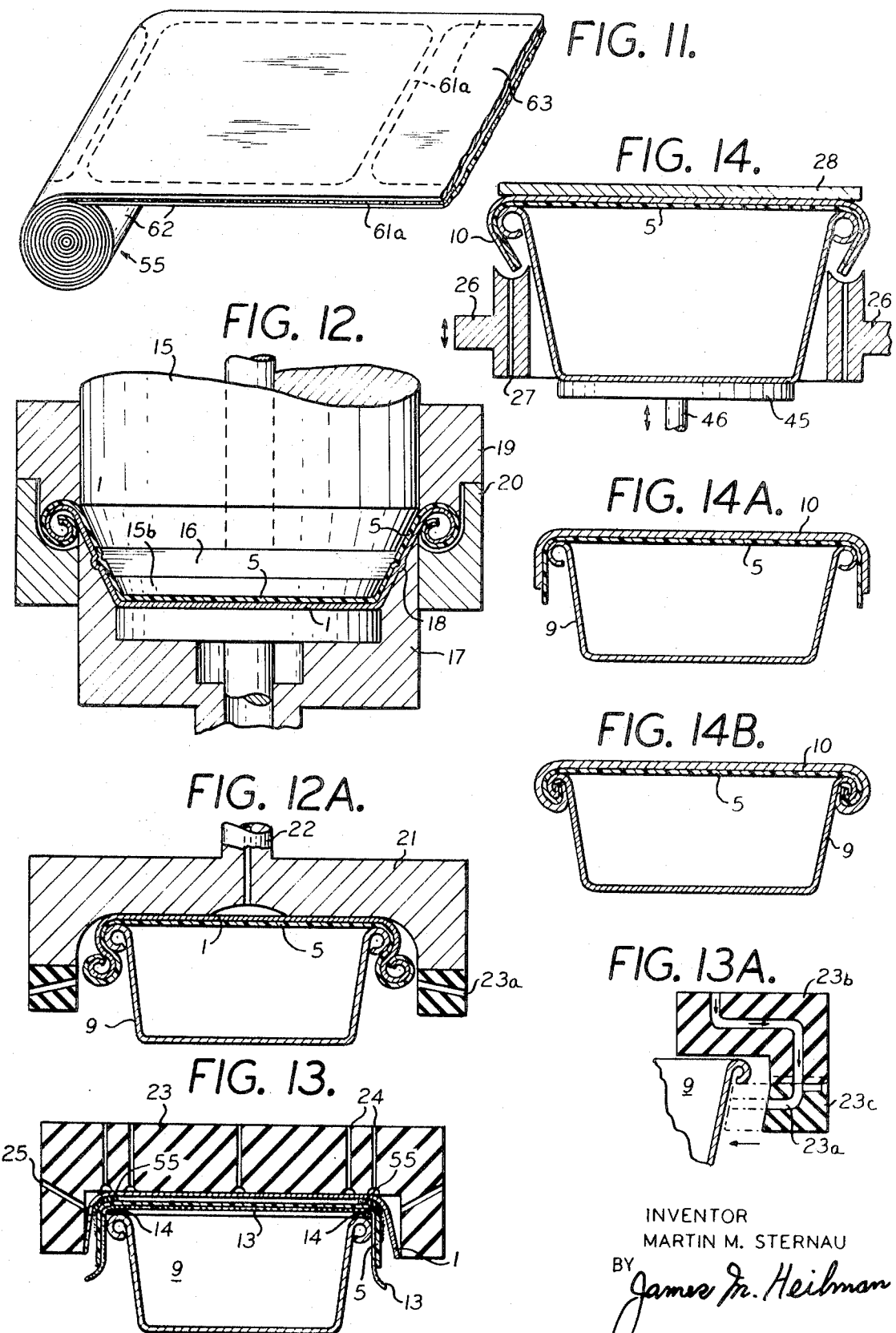

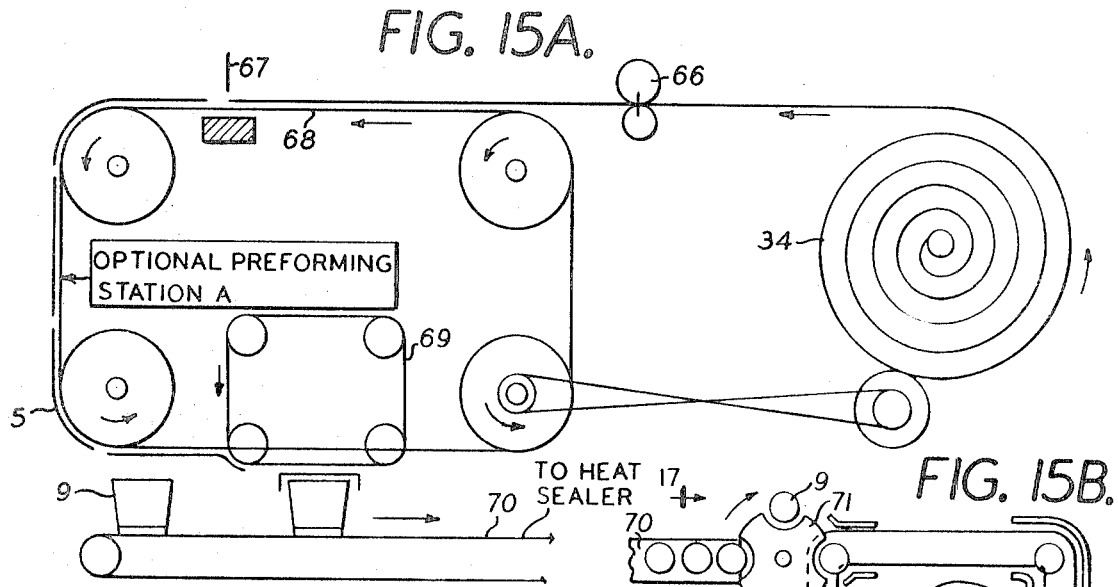

Nov. 23, 1971
M. M. STERNAU
3,621,637
APPARATUS FOR FORMING CLOSURES
Original Filed Oct. 23, 1965
5 Sheets-Sheet 5
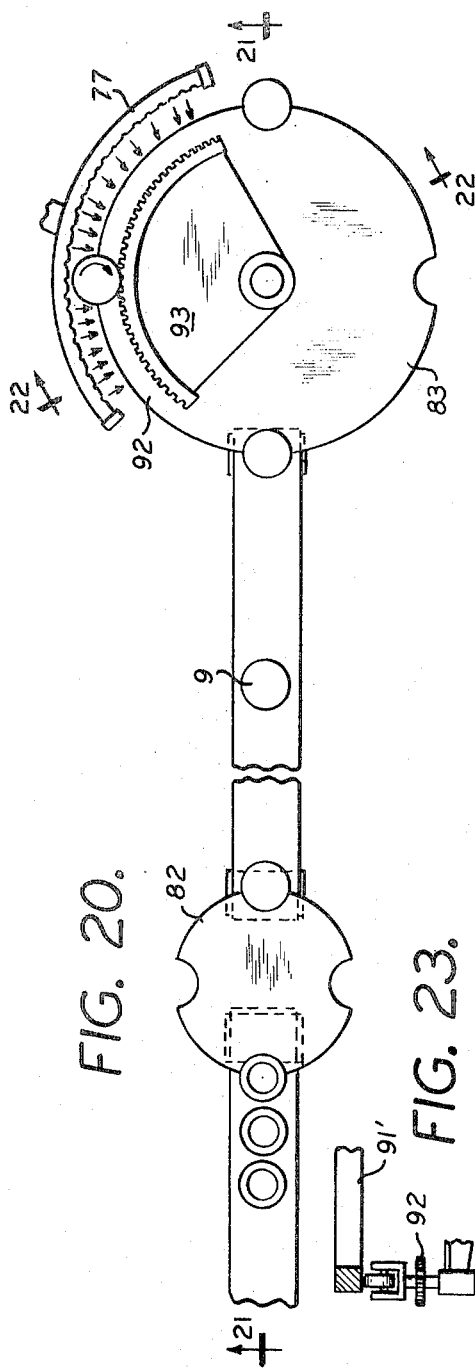
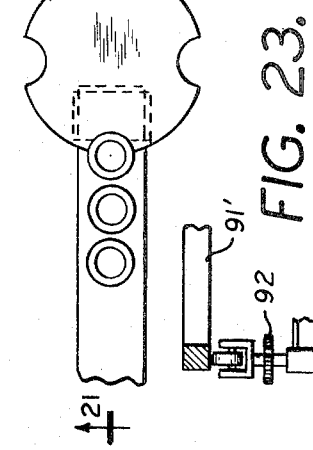
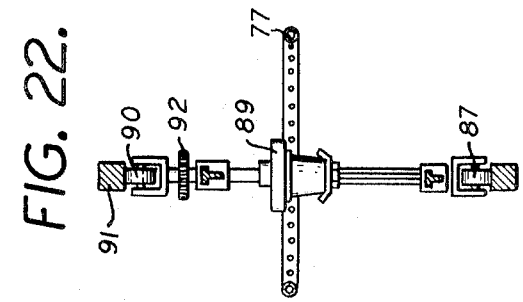
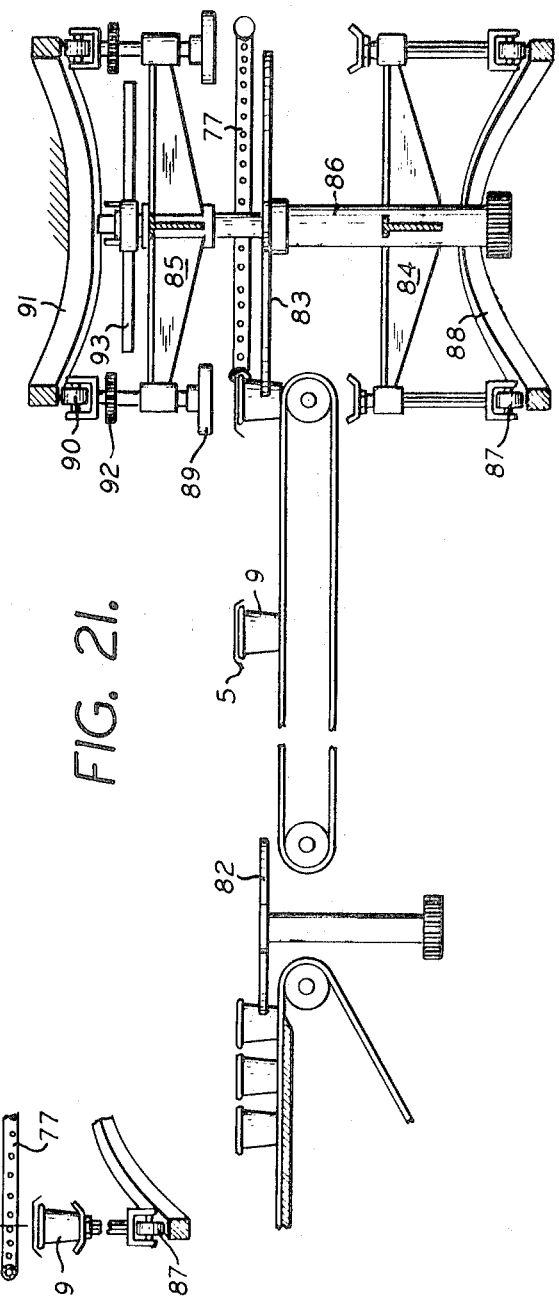
INVENTOR
MARTIN M. STERNAU
BY *James M. Heilman*
ATTORNEY.

3,621,637
APPARATUS FOR FORMING CLOSURES
Martin M. Sternau, Flushing, N.Y., assignor to W. R. Grace & Co., Duncan, S.C.
Continuation of application Ser. No. 508,639, Oct. 23, 1965, and a continuation-in-part of application Ser. No. 209,882, July 16, 1964. This application June 16, 1970, Ser. No. 48,902
Int. Cl. B65b 7/16
U.S. Cl. 53—329                          1 Claim

ABSTRACT OF THE DISCLOSURE

An apparatus for forming covers on containers comprising vertically movable shielding heads to hold a heat shrinkable covering film thereon and means to rotate the shield and container while heat is applied to shrink the exposed edges of the film against the side of the container.

---

This application is a continuation of Ser. No. 508,639 filed Oct. 23, 1965, now abandoned, a continuation-in-part of application Ser. No. 591,628, filed June 15, 1956, now Pat. No. 3,401,881 and Ser. No. 653,227, filed April 16, 1957, now Pat. No. 3,451,344, and Ser. No. 182,505, filed March 26, 1962, now Pat. No. 3,345,798, and especially S.N. 209,882, filed July 16, 1964, now abandoned, all of which are specifically incorporated herein by reference in their entirety. This application is also an improvement upon the cover disclosed in my Pat. No. 2,756,921, granted July 31, 1956, which is likewise incorporated herein by reference.

One of the objects of my invention is to provide a closure, which is an inexpensive, simple hermetic seal for a container irrespective of whether the container is made of paper, plastic, aluminum, steel, etc.

Another object of my invention is to provide a hermetic seal for a container irrespective of whether the container is made of paper, plastic, glass, aluminum, steel, etc., and irrespective of whether the container or the cover is rectangular, circular, hexagonal or any other shape, and to provide the apparatuses, methods, processes and techniques therefor. If desired, the container may be of one shape (as circular) and the cover of another shape (as rectangular) and thereby provide an enlarged or "pull" projection for easy removal.

Another object of my invention is to provide an outside or an inside closure formed from a transparent, heat shrinkable, oriented plastic sheet alone, or from two dissimilar materials, the inner component being formed of a limp film of a fragile, transparent, thin, flexible, unformed, heat shrinkable, oriented plastic film of any type and the outer component being formed of a semi-rigid, moldable material, so that a one-part, a two-part, or a two-ply closure will result.

Another object of my invention is to provide a sealing closure that will permit removal and replacement of the outer cover (which may be provided with a central viewing opening if desired) whereby inspection of the entire contents of the container may be made without breaking the seal of the inner component, thereby eliminating the danger of contamination.

Another object of my invention is to provide a dome-shaped cover with a gathered skirt and elastic edge for use as either a shower cap or a replaceable closure which will enclose the rim of the container in a sanitary manner. This may be preformed or formed initially from unformed material at the time of sealing the container.

Another object of my invention is to provide a closure which will deform due to reduced or increased pressures without damage to or loss of seal thereby reducing the hazard of deformation or breakage of the container due to said varied pressures, and a closure which will materially strengthen the container upon which the closure is sealed to resist deformation and withstand shock.

One of the objects of my invention is to make an improved closure, with or without an inside cover of plastic material (and vice versa, i.e., with or without an outside cover) in which the rim is pleated or gathered before being formed or rolled in such a manner that expansion and contraction at the rim area may occur to receive and to hold the slightly larger bead on the mouth of a container by snapping the rim of the closure below the bead of the container. If an inside and outside cover are used, they may have non-registering steam or heat escape openings and may be secured together mechanically or adhesively, at their rim areas only, or cemented throughout their entire area, or at spaced apart areas or points.

Another object of my invention is to provide a method of forming a limp, drapable, unformed plastic film in situ on a container to make a hermetically sealed closure.

Another object of my invention is to provide a method of manufacturing a hermetically sealing cover from basic raw sheet materials directly upon the container upon which it will be used and at the time of closure of the container, using the container as the male forming component or die for making the closure.

Another object is to provide heat selectively to a plastic cover, i.e., the application of heat first to the rim areas of the cover, and subsequently, if desired, to the inner or central area and preferably in somewhat lesser amount or lower temperature.

Another object of my invention is to provide a construction of materials which includes a shrinkable film, with or without a protective cover, that may be manufactured into a closure either prior to or during application on the container without any preforming of the unformed plastic film in any way whatsoever.

A still further object of my invention is to provide a cord to tear open either the plastic film, or both covers when a two ply or a two part closure is used, and to provide additional sealing means such as wax or cement, on either the closure or the container, in case additional sealing insurance is desirable.

Another object of my invention is to provide a method and apparatus for forming the cover or a series of covers and for positioning the same and sealing the same on a container or a series of containers.

A further object is to provide an apparatus and method for the rapid sealing by either signle ply or two ply closures on a series of containers in a single column or in multiple columns wherein either the container, the cover, or the cover forming die is raised, lowered, or revolved relative to the other component.

A still further object is to provide an optional preforming station in the conveyor line whereby a two ply or two part closure may be preformed into a snap-on cover and subsequently applied to a container and passed through a heating zone or heating tunnel, or, on the other hand, may be laid flat on a container and formed or curled immediately prior to or at approximately the same time that heat is being applied to the inner plastic cover.

With the foregoing and other objects in view as will appear from a reading of the following specification and claim, the invention resides in the novel arrangement and combination of parts and in the details of construction and process of manufacture hereinafter described and claimed, it being understood that changes in the precise embodiment of the invention may be made within the scope of what is claimed without departing from the spirit of the invention. The foregoing statement is particularly applicable to the mechanical details, all of which may be varied widely and still be within my inventive concept or the equivalent thereof. Among the latter, for example, is elevating the container instead of rotating it or lowering the forming head, all for precisely the same result.

It will be further understood that the invention is susceptible of embodiment in many and various forms, some of which are illustrated in the accompanying drawing, and that the structural details or particular steps of the method herein set forth may be varied to suit particular purposes and still remain within the inventive concept.

Referring briefly to the figures:

FIG. 2 is a perspective view of the puncturing roll, while

FIG. 6 is a schematic drawing of a modified apparatus showing the application of adhesive to make a laminated closure for immediately punching out or to be placed on a wind-up roll for future use, while FIG. 7 is an enlarged detail view showing the cement, glue or other adhesive applied to the heat shrinkable, fragile, plastic film.

FIG. 8 is a cross-sectional view of a two ply cover having a central inspection opening and a plurality of bonding areas, while FIG. 9 is a perspective view of the same.

FIG. 10 is a modified form of closure showing the inner cover and the outer cover cemented together throughout their entire area, while FIG. 11 shows a further modified form of two ply closure glued only around its circumferential area.

Figure 1:
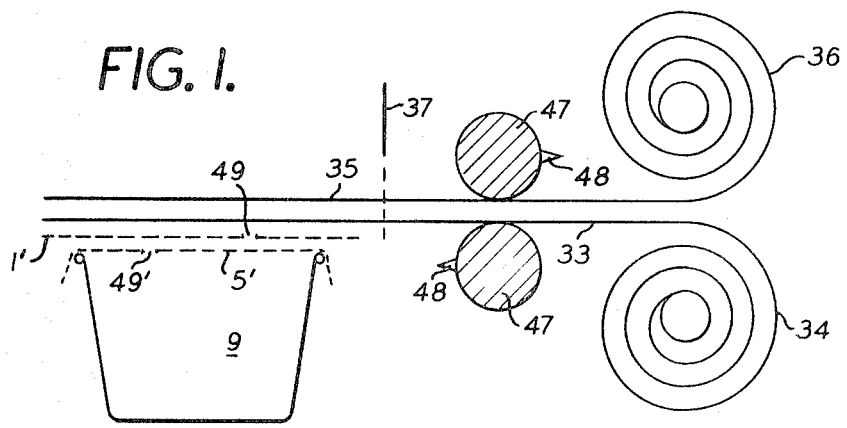
FIG. 1 is a schematic illustration of an apparatus for forming a two ply or two part closure, and FIG. 3 of a one ply closure or a pre-rolled laminated closure, with an optional tear string, all of the type as disclosed in the above copending applications.
Figure 2:
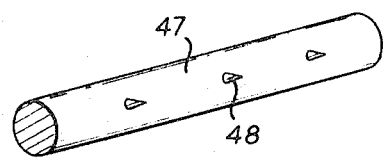

FIG. 12 illustrates a preforming apparatus with curling rings, a 2 piece male die having a resilient ring to form a weakened peripheral crease or indentation in the sidewall of the closure, and a female die having a peripheral groove for providing said indentation for subsequent bowing the sidewalls to receive the rim of a container, while FIG. 12A shows a further die positioning the preformed closure over a receptacle. Obviously, if preforming is accomplished at Optional Preforming Station A (see FIG. 15A), no heat passageway 23a at this point will be necessary.

FIG. 13 shows a head either only to form the closure at the time, or immediately prior to the time, that heat is applied to the inner cover (as illustrated by 23' in FIGS. 16 and 18), or to both form and seal the closure. Individual heat passageways 25 through the head are unnecessary if an external heating fixture is used (FIGS. 18 and 18A). For clarity, the edges of the plies are shown separated, but this tool could be used only with a plastic cover alone or a 2-ply closure secured at or near their rim areas. If not so secured, a modified form of forming die having slidable wing extensions to crimp or curl the outer bendable cover as illustrated in FIG. 13A is necessary.

FIG. 14 shows a modified form of tool for crimping and applying heat to the closure, while FIGS. 14A and B illustrate a cover before and after sealing.

FIG. 15A is a schematic drawing of a production line showing one method of initially positioning the rudimentary cover, and 15B showing the further step of simultaneously forming the closure, and at the same identical time of forming the closure, also accomplishing the added function of sealing the closure to the container with no interval of time between the forming and the sealing operation (see FIG. 18).

FIG. 16 is a view taken on 16—16 of FIG. 15B showing in schematic fashion the details of the cam arrangement for shielding and holding the limp, drapable plastic film or the preformed 2-ply closure over the container.

FIG. 17 is a view taken on the line 17—17 of FIG. 15B showing the transfer mechanism and gears in the heating tunnel.

FIG. 18 illustrates a detail of the simultaneous forming and sealing zone, while FIG. 18A illustrates a modified zone where the forming is mechanically assisted a short interval before the sealing occurs.

FIG. 19 shows a modified film which is perforated rather than cut completely, and further is perforated only in a cross direction.

FIG. 20 illustrates a modified form of transfer and sealing device, while FIG. 21 is a cross-sectional view taken on the line 20—20 of FIG. 20, and FIG. 22 is a cross-sectional view taken on the line 22—22 of FIG. 20.

FIG. 23 is similar to FIG. 21 but with a cup shaped head which rotates in the same horizontal plane while the container carrying a plastic film or a laminated cover is raised to have the closure formed and sealed to the container.

My invention may be used either as a 1-stage or a 2-stage operation. In other words, the transparent film may be used alone or the outside cover may be used alone, or if the combination closure is used, the inside cover may be first applied and then the outside cover applied later, or, in a more practical way, the two covers may be formed together and applied as a laminated unitary closure bonded together at selected areas.

While certain aspects of the invention, i.e., the elastic plastic cover, may be first used as a new replaceable cover for containers when the usual original metal or rigid plastic covers are destroyed, or for any other purposes for which a plastic dome-shaped cap may be used, such as, a shower cap, refrigerator dish cap, etc., this invention is primarily a closure for a receptacle. The closure consists of a combination, laminated or otherwise physically held in approximately uniform parallel position, of an inner or underside cover of a shrinkable and clear, translucent, or opaque, film or sheet of various materials, and an outer cover of a moldable, rigid, or semirigid, and clear, translucent, or opaque material, such as aluminum, paper, plastic, glass, steel, etc., or combinations thereof. The inner cover is to provide a seal for the container on which the closure is used, and the outer cover is to provide a mold or retaining device or heat shield for the former during the sealing operation, and to provide an ultimate protecting cover for the inner cover and for the container upon which this closure is used.

As one example, the outer cover of the closure possesses a peripheral flange formed prior to, or during, the operation affixing the closure cover or covers to the container and having applied at its outer rim or edge means wherein both components of the closure are rolled, curled, bent or otherwise temporarily or permanently held together so that the inner component of the closure is held or retained by or within the rim of the outer component. The securing together of the two covers or components is done prior to, during, or after the sealing operation.

There are any number of possibilities by which a closure as outlined above may be put into a practical form, for instance:

(1) A closure may be made as shown in FIGS. 1 (or 3 and 15 if a laminated material is used) comprising plies of dissimilar materials, the inner layer consisting of a transparent film shrinkable under heat application, the outer layer made of aluminum sheet or any other moldable material. Both components are formed into a cover having, as one example, a circular or rectangular top portion and an integral peripheral flange and a beaded rim. If this type closure is snapped onto a container with a beaded or a plain edge, the bead of the closure will be locked circumferentially below the rim of the container. When heat is applied to the rim of the closure or to the container, or to the covered container, the following takes place:

(a) The film will primarily shrink a maximum distance circumferentially around the rim of the container due to more rapid heat absorption of the exposed, uncovered, or unshielded film at this general area, with the result that:

(b) It will pull the beaded rim of the outer layer of the closure tighter around the circumference below the bead of the container. This occurs because both elements are engaged at the rim area thereby making the outer cover tighter on the container.

(c) The shrunken film at the rim will conform to the shape and irregularities of the container rim creating an additional seal around the rim of the container.

(d) Due to this primary local shrinkage around the rim, lip, or edge of the container, the entire inner component is fastened or anchored at the rim, lip, or edge, and the remainder of the film is pulled tightly across the mouth of the container, creating a closure which, being so created, is in constant tension, said tension thereby further tightening and improving the seal at the edge of the container and said tension further strengthening the container against deformation by pulling equally at all points at the container edges towards the center of the closure. This tension in the film is further increased by any secondary heat absorption in the portion of the film covering the mouth of the container, still further improving the seal at the mouth of the container.

(e) A properly selected wax, heat sensitive cement or heat softening material can be applied to the cover near its rim or to the rim of the container before attaching the cover. When heat is applied, this wax will melt simultaneously with the shrinking of the film, the film enveloping the rim of the container, and the melting wax, etc. being drawn by capillary action into any surface irregularities at the rim of the container and therewith form or assist in forming a leakproof seal.

Similarly, the above function takes place with different type closures used on different type containers, and for specialized contents. For example, in sealing the closure on containers containing frozen foods, the seal may be made by passing the closed container through a heated oven or tunnel or past a hot air jet. The system being at a lower temperature, a greater amount of time or heat will be required to reach the shrinkage temperature of the film. That area capable of most rapid heat absorption and therefore that area where shrinkage conditions will first be reached is the rim circumference of the closure since at this point the film is relatively exposed and not shielded. In passing through an ambient hot air oven, this exposed rim portion of the film will require less time to reach shrinkage temperatures, thereby permitting the seal to be made at the rim of the container, which may (or may not if not desired) be followed by tightening of the film across the entire mouth of the container. To create a closure in further tension, additional film tightening is accomplished by additional heat application over the entire area of the cover or film. This additional heat application may be accomplished by an increase in temperature or an increase in time.

(2) A cover may be made as shown in FIG. 12, for example. This cover has a peripheral crease to facilitate the formation of a peripheral bulge before the closure is snapped onto the container (FIG. 12A). A closure as shown in FIG. 12 has the advantage of economical space saving stacking for packaging.

(3) A closure may be made using the outer single ply cover, of aluminum, or paper, etc., as a retainer or shield or both for a shrinkable plastic sheet, said sheet being larger than the mouth of the container. The plastic sheet is placed on top of the container, and the cover snapped onto the container. This will create the essential condition that the film is held substantially flat across the mouth of the container, while the edge of the film is arranged around the rim of the container in pleats protruding beyond the outer cover. When heat is applied to the rim of the container the protruding film will shrink and will conform to the shape of the rim of the container. Hence, a tight seal is formed around said rim, while the remainder of the film is pulled tightly across the mouth of the container. If additional heat is subsequently applied over the entire area of the closure, further tightening of the seal will result. This method has the advantage that the outer cover can be removed without disturbing the seal of the film portion of the closure. This process has the additional advantage that the outer cover can be repeatedly taken off and snapped back onto the container without losing its original efficiency of snapping onto the container, and locking below its rim due to its expandable pleated rim. Furthermore, the outer cover may be used to recap the container after part of the contents have been removed.

(4) A closure may be made as shown generally in FIG. 1 but with the outer cover 30 having a hole 31 in the center for visual inspection through the transparent inner cover 5 without removing the cover or breaking the seal, all as shown specifically in FIGS. 8 and 9.

(5) A modified closure may be made in which the heat shrinkable cover 5 is provided with a secondary inner ply consisting of a moldable or rigid material, such as cardboard or plastic, bonded to the heat shrinkable film. This inner layer is designed to fit inside the container rim so that, when heat is applied during sealing, the film closure shrinks around the rim of the container, as described in paragraph (3) above, to form a sealing closure. The cardboard, plastic, etc. then acts as a stiffener or brace for both closure and container. This is of advantage in particular on large mouth containers or on oblong containers where the long side of the container rim or side may buckle under the tension of the shrinking film, in which case the stiffener will prevent this from happening. Also, the reenforcement may lie on top of or over the rim of the container in which case it will stiffen largely only the plastic cover and to a much lesser extent the container. This stiffener may be shaped in the form of a single cut out rib or cross, or a solid or perforated disc or rectangular blank or any other suitable configuration. Obviously, an outer protective cover over the rim may also be used if desired.

(6) A closure may be made by using a shrinkable film bonded throughout its area (FIG. 10) or in spaced areas (FIGS. 7, 8, 9, and 11) with a two ply moldable material, such as aluminum foil laminated with paper, as used for example on milk bottle tops. If such a three ply closure is placed over the top of a milk bottle, with the heat shrinkable film on top of the outside of the 2-ply material (or on the inside if the entire combination is laminated together) and retained while heat is applied at the rim of the container, the film protruding beyond the moldable material will shrink around the rim of the milk bottle, which will result in a crimped cap on the bottle.

Figure 3:
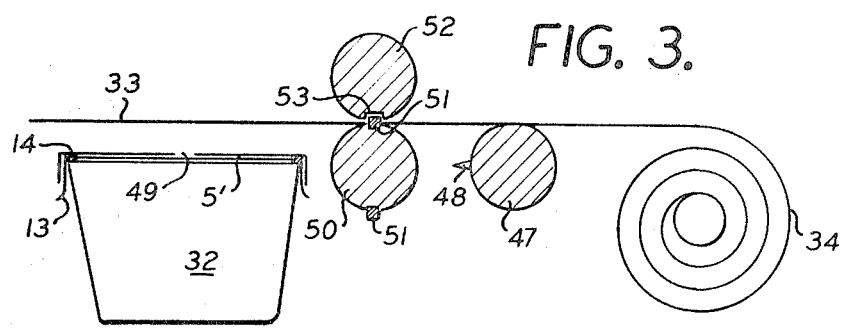

It is not necessary, but if desired, as shown in FIGS. 3 and 13, a wax, or cement, or some other sealing medium 14 may be applied to the cover or to the container prior to or during the sealing operation, and said material will adhere to the shrinking or shrunken film during the heat sealing operation and thereby provide double protection against leakage. Also, any of the covers may have incorporated a means of tearing, or otherwise removing said sealed film cover by means of a string, band, etc. 13 by having this device incorporated into the cover construction prior to or during the sealing operation as shown in FIGS. 3 and 13.

Since the rim of the plastic film portion is generally rolled into the rim of the aluminum portion of the closure, it is locked and retained by the aluminum portion of the cover. Or, if preferred, additionally or alternatively, the film may be bonded or glued to the aluminum peripherally at the rim only. Obviously, if preferred, the two covers may be glued together throughout or at various zones over their areas leaving the intervening portions free, as illustrated in FIGS. 7–11. Consequently, when the cover is snapped on an aluminum container, and heat is applied to affect selective shrinkage of the cover, the plastic film portion will primarily shrink a maximum amount circumferentially around the rim of the container due to the cover design. Thus it will take the shape and configuration of the rim of the circular, rectangular or other shape of the container, and create therewith a leakproof seal around the rim.

It is a novel feature of this invention to place a sheet of shrinkable, oriented plastic film on top of a paper, plastic, aluminum sheet or foil container and to retain and shield it by means of any outer cover and, by subjecting it selectively to heat, to shrink it around the mouth of the container thereby forming a leakproof, dome shaped, removable and reappliable cover. Because of the particular design or construction of the closures described above, selective heating causing selective shrinkage is also inherently present when overall heat is applied for the following reasons:

In a closure wherein the heat shrinkable film protrudes beyond the rim of the container in combination with the retaining and shielding snap-on cover as previously explained, if this cover-film-container system is subjected to overall heat, it is obvious that the protruding unshielded film will be affected by heat application first. This occurs since the protruding edges are the only portion of the film component of the cover which is not shielded from the heat application by the outer component and the container. In consequence thereof this portion will shrink first, i.e., before the rest of the film, which is shielded by the retaining cover and the container, reaches the shrinkage temperature, so that selective shrinkage is affected.

Similarly, selective heating causing selective and controlled shrinkage will result through overall heat application on a two ply cover, where the film is rolled together with the outer ply at the rim, as shown in FIG. 12A. In this type cover that portion of the film which is not shielded, i.e., exposed, and capable of absorbing heat before those portions of the film that are shielded, is located circumferentially below the rim of the container at the area where the seal will occur. As a result, for this two ply closure also selective heating and selective shrinkage are obtained, although overall heat application may be employed. The same holds true to a greater extent, if the contents of the container are frozen, since selective heating by overall heat application and consequently selective shrinkage becomes more pronounced.

While the various features of this invention coact together, for simplicity and clarity the various broad features may be broken down as follows for an understanding of the invention:

(A) Single ply of limp, heat shrinkable, fragile drapable plastic film or thin, opaque aluminum foil, paper, or other metal.

(B) Two ply closure secured together, or a detachable two part closure of above materials. (It might be here noted that the outside covers serve not only to protect the limp, unformed, draping plastic cover, but also, when heat is applied to seal the plastic cover, initially holds down and shields the main portion of the plastic cover while leaving the edges thereof exposed to heat.)

Figure 4:
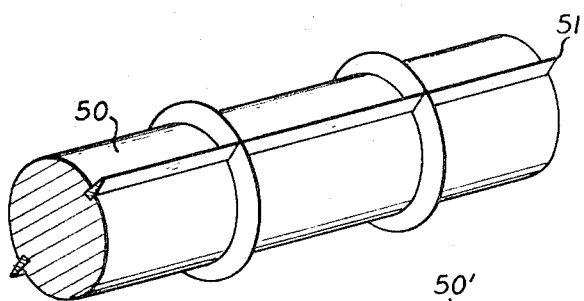
FIG. 4 is an enlarged view of the slitting roll in which the knives are continuous in both a longitudinal and a circumferential direction.
Figure 5:
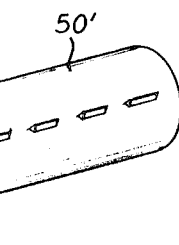
FIG. 5 is a view of a modified form of a separating roller by which the slits obtained are discontinuous or the material is perforated only in a cross-wise direction.

The method and apparatus illustrated may be grouped as follows:

(1) Preformed closure (FIGS. 12 and 12A)
(2) Continuous process
    (a) Rolls of material (FIGS. 1–6, 13 and 13A)
    (b) Individual operation (FIGS. 14, 14A and 14B)
    (c) Complete system (FIGS. 15A to 18)
    (d) Modified system (FIGS. 20–23)
(3) Types of laminations (FIGS. 7–11)
(4) Forms of individual covers (FIGS. 4, 5, and 19)

In most figures and in most instances in the specification, where reference is made to a two ply closure, the same statement should be considered as generally applicable to a single ply closure, and vice versa. Also, where reference is made to a two ply closure or laminate, two or more plies are inferred including those constructions where an inner brace or rib is used to be positioned within the rim of the container and prevent the sides from collapsing.

The closure can take many forms and be formed in various ways. One of these is the preformed closure being formed in FIG. 12, wherein 1 is the outside protective metal or paper cover and 5 is the inner plastic cover. The weakened area 18 is formed in the side wall when movable heat 15b is raised against inner head 15 forcing resilient ring 16 outwardly. At the same time curling rings 17, 19 and 20 form the rims of both the inner and the outer covers, crimping them tightly together. Subsequently, upon the application of pressure, either in a separate operation before, or as the cap is being secured to the container, due to the crease, the bulge will be formed, as clearly illustrated in FIG. 12A. Forming and sealing die 21 of metal or heat insulating material having a suction opening 22 positions (and forms if necessary) the protective cover 1 and plastic film 5 over container 9. The die 21 has asbestos or hard rubber tips where heat passageways 23a are located. Obviously, the forming and sealing heads, FIG. 13 or 13A, could be used in place of head 21.

A modified type of closing means is illustrated in FIGS. 14, 14A, and 14B; 14A illustrating the closure before being formed by the apparatus of FIG. 14, and 14B after being formed. In FIG. 14A, protective cover 10 and inner plastic film 5 are placed by hand or by any number of different types of automatic machines over container 9. Subsequently, a retaining or shielding plate or cover 28 is placed over the plies before the curling tool 26 crimps the rim of the closure around the bead of the container. Heat is then applied through passageways 27 to form the completed closure, as indicated in FIG. 14B. The container may be moved relative to the crimping and sealing tool in any conventional manner as by being placed upon a vertically movable platform 45 supported by stem 46, or alternatively, the tool may be moved vertically while the platform remains stationary.

A third broad general type of high speed production closing means is illustrated in FIG. 1 (and FIG. 3) wherein a roll 36 of aluminum foil or paper 35 and a roll 34 of plastic material 33 are passed through perforating rolls 47 having pointed punches 48 thereon to form non-aligned apertures 49 and 49' in the laminated material; the apertures being for venting purposes without permitting spilling of the contents.

Various sections, suitable for covering the containers to be sealed, are severed at 37 and are then placed over the containers 9 or 32 as illustrated by 1' and 5'. The covered container 9 is then sealed in any approved manner such as by raising it or otherwise moving it on a platform 45 or otherwise into a forming and sealing head 23 or 23b having heat passageways 25 or 23a, such as illustrated in FIGS. 13 or in 13A, respectively. The modified head 23b has slidable ends 23c to further crimp the metal protective cover 1. Obviously, if the edges of the foil cover and plastic cover are glued together, the shrinking plastic cover will itself crimp the foil to container 9 in FIG. 13 without using crimping wings such as 23c illustrated in FIG. 13A. Obviously, if a two ply closure is used, the heat passageways 25 preferably should be at the extreme lower end of the sealing head and sloped upwardly so as to impinge more directly upon the plastic film similar to that shown in FIG. 12A.

The sealing head of FIG. 12A likewise could be used in conjunction with the apparatus of FIGS. 1 and 3. Obviously, the suction lines 22 in FIG. 12A, and 24 in FIG. 13 could be dispensed with if some alternative type of elevating mechanism were used.

Additional sealing and removing means can be used if desired for, as shown in FIGS. 3 and 13, an opening string of glass fiber etc. 13 may be incorporated directly into the roll 34 of film or foil or placed separately over the container; sealing cement, wax, etc. 14 may be applied to the rim of the container or to the adjacent cover 5, which cover can be secured by adhesive 55 to an outer cover.

FIG. 3 shows a machine for applying a plastic cover similar to FIG. 1, but with a wider width of plastic film so that by using a different type cutter, such as cutter roll 50 having longitudinal and circumferential knives 51 therein engaging in grooves 53 of upper roll 52. The film may be slit or perforated into multiple strips, squares, etc. and a plurality of columns of containers covered and sealed at the same time. The details of this cutter roll are illustrated in FIG. 4, while FIG. 5 shows a modified cutter or perforating roll 50' having discontinuous teeth 51' thereon. Obviously, similar circumferential teeth could be supplied in addition to the longitudinal teeth 51', if desired.

The container 32 in FIG. 3 has no bead at its rim and, like FIG. 13 is provided with a layer of sealing cement, wax, adhesive, or other sealing compound 14, between the cover and the rim of the container. Also, if desired, the container may be provided with a pull or tear string 13 between the sealing compound and the cover. The two components of the closure of FIG. 1 could be fed from one roll as 34 in FIG. 3, having been re-rolled onto the single roll in a prior operation.

FIG. 6 shows a series of two ply closures being formed on a wide sheet. Glue roll 64 dips into a glue pot 65 and applies a series of glue rings to the plastic sheeting 33 either in a circle formation as shown, or in some other spaced apart or continuous arrangement. After the plastic film is glued to form the laminated sheet 54 it is fed to a punch press, or to a wind-up roll, such as 55, for future use.

FIGS. 7-11 illustrate various types of laminated closures. FIG. 7 is a detail view of FIG. 6 with a single ring area of adhesive in which the outer cover and the inner cover are secured together.

FIGS. 8 and 9 illustrate a laminated cover with a viewing opening 31 in the outer protective cover 30 bonded to the transparent inner cover 5 by a double ring of adhesive, i.e., an outside rim circle 58 and an inner circle 57.

FIG. 10 illustrates the two covers 59 and 60 laminated throughout by adhesive 61, while FIG. 11 shows the laminated wind-up roll 55 of plastic 62 and aluminum 63 bonded together by adhesive 61a at their outside edges and cross-wise of the width of the laminated material at predetermined areas, so that when cut, the laminated material will be sufficient to cover the opening of a container with a bonded area entirely around the outside edge of the cut-off sections, i.e., secured together only in a series of zones corresponding to the opening of the containers to be sealed and being free of each other inside the bonding zones.

FIGS. 15 to 23 illustrate by schematic drawings two broad general types of plant set-ups for continuous operations.

FIGS. 15A and 15B show a continuous plant layout for sealing a continuous line of filled containers. While the containers are shown in tandem, the line could easily be modified to cover multiple columns.

Roll 34 of plastic film passes through guide rollers 66 to a severing device 67. The severing device may be a knife, but is preferably a heated wire which not only severs the plastic film, but also separates it. In the operation, the cut edges shrink slightly, causing a space between the individual sections of the film. The film is carried by belt 68 past an "Optional Preforming Station A" onto a transferring belt 69 where the sections are laid on containers 9.

At the "Optional Preforming Station A," if a two ply closure is used, it can be preformed here, using a mechanism similar to that illustrated in FIGS. 12 and 12A, with or without heat being supplied at this point.

Reverting to the single ply closure, after being placed over the container, by means of conveyor 70, the covered container is forwarded to a spacing turret 71 as illustrated in FIG. 15B. From this point the container is advanced toward a sealing zone 72. Prior to entering the sealing zone, however, a reciprocating head 23' traveling at the same rate of speed as the container and operated by a cam 74 descends and retains the plastic cover in place on the container. The stem of head 23' has at its upper end a rotatable gear 75 which meshes with a stationary gear 76 inside the sealing zone or heating tunnel so as to rotate the container with draped plastic film so that the steam, hot air or even hot water from the heating pipe 77 will impinge equally on all sides of the film draped over the circular or rectangular container. The heat can be supplied to the heating tube 77 from a central heat producing station or air may be heated by means of electric wiring 78 instantaneously just before leaving the heat conducting tube, as shown in FIG. 18A. Alternatively, a heated electrical contact wire at the lower side of the head upon touching the cover would cause shrinkage.

After leaving the heating tunnel, the then sealed container moves to a directional turret 79 and then to a packing department by conveyor 80.

Retaining head 23' is made of heat insulating material and may, if desired, be also cooled by water or any other type of cooling means. While it may be flat, it may also be dish-shaped, as indicated by 23" in FIG. 18A. The dish-shaped retaining means is obviously necessary where a two ply closure is used, and even desirable where a relatively thick, semi-rigid plastic material is used as a cover.

FIG. 19 indicates a film on which a different type of perforating means operates. The knife has spaced points, generally similar to that shown in FIG. 5, so that subsequently the various sections may be torn from the main sheets by even a slight tension as they are placed on the container. Obviously, in addition to the transverse perforations 81, a series of longitudinal perforations may be made depending upon the number of columns of containers which it is desired to seal at one time.

A modified form of heat sealing device is illustrated in FIGS. 20-23, wherein a spacing turret 82 and a sealing turret 83 is shown. As the second revolving turret picks up the covered container, spiders 84 and 85 attached to central shaft 86 revolve with the turret. As this assembly rotates clockwise, the roller 87 on the container support will follow upwardly rising cam ring 88 causing the support to carry the container, while the retaining head 89 attached to roller 90 will follow downwardly directed cam 91, thereby retaining the plastic cover against the container just prior to entering the heating zone 92 where hot air 77 pours from the orifices to strike the unshielded portion of the plastic cover.

During the passage of the container, cover and retaining head through the heating zone, this assembly of elements will be rotated in view of the fact that rotatable gear 92 is depressed and meshes with stationary gear 93 on a stationary vertical shaft.

FIG. 23 shows a slight modification of the cam arrangements in which only the container and its support rises, while the retaining head 23", which is dish-shaped, rotates, in the same horizontal plane. In other words, the container support and the container rise into the sealing head 23", then enter the heating zone, when the container is again discharged at the same level, at which it entered the revolving turret. The top proper may be shrunk and tightened by lifting the shielding cover just before the heating zone is left.

In lieu of retaining heads 23' and 23", gears, and heating pipes or other heating medium, combined forming and sealing heads 21 or 23 (FIGS. 12A and 13 and 13A) could be employed. Furthermore, line 22 in head 21 could be directed so as to have steam enter through the stem and exit only at the concave inside but completely around the die, and thereby impinge on the gathered plastic skirt at all points at one time similar to 23a in FIG. 13A. This eliminates the necessity for rotating the containers and the somewhat cumbersome gear arrangement. Other types of sealing heads are disclosed in my copending applications referred to in column 1.

Many modifications can be made using the broad general ideas illustrated merely by way of example in FIGS. 15 to 23. However, these modifications are obvious and involve merely the rearranging of various known elements and come within the spirit of my invention.

It should be noted that in all of the sealing tools, such as illustrated in FIGS. 12A, 13, 13A, 14, 18, 18A, 21, and 23, and other modifications described in the specification, that preferably the rim area of the cover is shrunk first, and as the cover is being withdrawn from its optimum, i.e., final position, the residual, secondary heat flows over the top of the plastic cover and shrinks that portion of the cover to make a plane, neat, tight cover. This is selective shrinkage as caused by selective heating.

My invention is particularly applicable when using heat shrinkable films that are normally less than .002" thick and capable of large shrinkage in all directions parallel to the film surface. Actually films in the range of .0002" (20 gauge) to .0008" (80 gauge) are generally satisfactory and may be used. The thickness of the film, of course, will depend somewhat upon the area to be covered. However, it is within the scope of my invention to use any type films that is shrinkable in only one direction as well as in two directions (e.g. an oriented film of the so-called tensilized or cross-tensilized type) which could be used on containers of particular form, such as on a rectangular container.

Typical examples of certain films which could be used are oriented films of rubber hydrochloride (oriented "Pliofilm," such as "Snug-Pak") or of vinylidene chloride (oriented "Saran," "Cryovac," biaxially oriented irradiated polyethylene, biaxially oriented irradiated polypropylene, heat shrinkable nylon, heat shrinkable Mylar, etc.), which are heat shrinkable by reason of their oriented internal structure commonly induced by stretching the same unidirectionally or multidirectionally while heated or supercooled. Obviously, the "orienting" of such films may be done by mechanical, pneumatic, or other physical methods of expanding or stretching the films, or by chemical or other means of realigning the molecular arrangement.

By way of example, the best degree of seal, especially on containers with circularly shaped mouths, may be assured through the use of internally oriented plastic films capable of linear shrinkage of 50% in all directions parallel to the film surfaces upon heating to temperatures between 160° and 220° F. One type of such material is standard "Snug-Pak" of 40, 50 and 60 gauge, sold by Tee-Pak, Inc., which is stretched to twice its width and to twice its length whereby to quadruple the area and to subsequently shrink down to ¼ of the original stretched area. "Pliofilm" made by Goodyear Tire & Rubber Company, for example, may be stretched appreciably more or appreciably less and consequently will be capable of shrinking more or less than standard "Snug-Pak." These percentages of shrinkage and temperature are by way of illustration only and may be varied within wide limits. Obviously, the shrinkage temperature will vary for different heat shrinkable films. Also, in all or practically all of the oriented films, the shrinkage action will take place instantaneously or almost instantaneously.

Films possessing the above mentioned overall shrinkage properties are desirable in order to produce adequate tightness of seal at the rim of the container where the greatest degree of utilization of the shrinkage property is required locally. It is to be understood, however, that the shrinkage values do not represent the overall reduction in size of the entire film in the closure after heat application, nor the actual shrinkage in producing the seal.

The selection of films of suitable shrinkability, suitable shrinkage temperature and suitable strength will be dictated primarily by the nature of the container or contents and the temperature to which the local area may be heated where seal of closure to container is effected, and such selection may be readily made. For example, where frozen items are being sealed in an oven and the blasts of heated air are coming in an upward direction from near the bottom of the oven or the bottom of the container, the container itself and the frozen food or frozen zone protects or tends to protect or shield the central area of the plastic cover and leave only the edges exposed to the ambient fluid heat or convection current heat and thereby alone (without any mechanical preforming) simultaneously form the closure and at the same identical time seal the container.

While I have referred to the film as being transparent since that quality would be most desirable in the food packaging field, it is of course understood that a cloudy, opaque, or colored film might be used, and that the color could be included throughout the body of the film or applied to either side. Also, the film might be a single film or a laminated film of two plies of plastics or of different material; the principal requirement to accomplish my invention being that at least one of the plies of the film be heat shrinkable and that this ply control the action of the laminated film.

The concept of selective shrinkage of shrinkable film may be defined as the controlled reduction in size of portions of said film to a substantial degree while holding the reduction in size of the balance of the film to a lesser degree or to none at all. This concept applies in the closures herein described through sufficient shrinkage of the film at the rim of the containers to lock and to provide a seal at the mouth of the container while controlling the shrinkage across the mouth of the container through the retention of the film at the rim, by shielding, by omitting the shrinkage medium over this area, or by any other means.

The shielding of the plastic film (with or without the retention or restraining thereof) may be accomplished by a heat insulating flat or recessed plate, upstanding hood, or even by the outer cover itself if a two ply or two part cover is used. An upstanding shielding hood or band may be desirable when the contents of the container are appreciably higher than the top of the container.

When a slightly heavier gauge film is used which will not normally drape by its own weight, the outside closure will function as a sealing head and force the edge of the film downwardly alongside of or adjacent to the wall of the container. In addition, when fluid heat is applied to the film, the container itself acts as an on the spot or in situ mold to control the shrinkage of the film and to determine the final shape of the cover. This is due to the fact that the cover being formed surrounds and assumes the contour of the container being covered and sealed.

It is therefore seen that there has been provided a leakproof and moisture proof closure, which is easy to manufacture and is inexpensive since no preliminary molding or preforming whatsoever is necessary. While the invention is particularly adapted for outside aluminum covers and containers of aluminum, the invention is equally effective for paper, plastic, steel, other metals or materials, etc. Also, while frequent reference is made to container covers, the same considerations hold true for any covers having a similar shape irrespective of whether used for replaceable dust caps, shower caps, swim caps, covers for refrigerator dishes, etc.

Any of the features shown in one modification may be used in any of the other modifications or combinations illustrated or described. As an example, the sealing means of wax, cement, thermoplastic material, etc. 14, shown in FIG. 13, could be used in FIGS. 12A and 14B; an outer protective cover 6, shown in FIG. 13, could be used in FIGS. 13 and 18A; heating elements, 77 and 78, could be substituted for by a hot air or steam passageway similar to heating element 23b and vice versa; the steam jet could be replaced by a hot air jet or an electrical contact wire 68' or heating wire 68; the reciprocating platform 45 could be replaced by a rotating platform; the container may be elevated or moved laterally, or the cover may be positioned on the container at one stage or at a later stage or picked up by a container on an elevator or some other movable support; the roll 34 of single ply material in FIG. 3 may be a laminate of two types of material and even two types of plastic films, etc. These are mere mechanical changes readily apparent to a mechanic skilled in the art and all within the scope of my invention.

Other modifications of the principal items of this invention are clearly apparent, and I do not desire to be limited in my invention except as set forth in the claim.

In summary, FIGS. 1–11 and 19 illustrate the forming from rolls and closures or blanks of a 1-part very thin, flexible, fragile, drapable and droopable, heat-shrinkable plastic film, a 2-part separable closure, and a 2-ply unitary closure.

The blanks illustrated in FIGS. 1–11, and 19, could be substituted for the roll 34, as illustrated in FIG. 15A. As a matter of fact, FIGS. 1–14B and 19 are elements or modifications of the elements illustrated in the complete process 15A and 15B, or in the modified transfer and sealing mechanism 20–23.

FIGS. 12 through 14B show dies and closures, the dies and the operations thereof of which may be included in the "Optional Preforming Station A" illustrated in FIG. 15A. As is apparent from FIG. 15A, if a 2-ply or 2-part closure were desired, the die of FIG. 12 could be positioned at "Station A" where the outer protective cap 1 could, if desired, pick up the heat-shrinkable film and move forward to meet the container 9 by means of positioning seating belt 69 as is generally known in the art, and thence pass through the "Sealing Zone" of FIG. 15B.

If a 2-ply or 2-part protective closure is desired, a die such as FIG. 12 or its equivalent would be necessary to form the protective outer aluminum cover and apply a spot of adhesive thereto before it contacts the plastic film and is conveyed to a spot where it is positioned over the filled container. Obviously, as stated in cols. 3 and 4, if preforming is accomplished at Optional Preforming Station A, in the schematic drawing of FIG. 15A, no heat passageway 28 at this point, i.e., Preforming Station, will be necessary.

FIGS. 16, 17 and 18, including the modification FIG. 18A, are views along section lines taken on the sealing machine illustrated in FIG. 15B.

FIGS. 29–23 illustrate a modified form of transfer and sealing device which rotates the container and has cams for both raising the filled containers and lowering the shield discs.

Many modifications could be suggested, and pages could be written, describing conventional additional connecting structure and details between the various elements and the various assemblies herein shown. However, it is believed to be unnecessary to describe these conventional elements since they are well known generally in the art; among which is Cheeley, 3,017,729.

I claim:

1. In an apparatus for forming closures on containers from heat shrinkable film in which the film is positioned over the mouth of the container and shielded so that the edges of the film which extend beyond the rim of the container may be selectively heated and consequently shrunken against the sides of the container to form a closure, a device for transferring and rotating said containers while heat is being applied to said film edges comprising;

(a) a recessed rotating disc to move the film covered containers while heat is being applied;

(b) a series of shielding heads positioned above said film-covered but unsealed containers;

(c) gear means associated with said heads to turn said heads and consequently turn the covered containers;

(d) a cam and cam mechanism to force the shielding heads to descend and hold the heat shrinkable film securely against the containers and to rotate the same while heat is being applied;

(e) a cam arrangement having a moveable seat thereon whereon the containers will ride up and be engaged by the shield; and (f) means to apply heat to said film edges as the container is being rotated.

References Cited

FOREIGN PATENTS 1,259,109   3/1961   France _____ 53—42

TRAVIS S. McGEHEE, Primary Examiner

U.S. Cl. X.R.

53—42